(12) United States Patent
Hütter

(10) Patent No.: US 6,477,123 B1
(45) Date of Patent: *Nov. 5, 2002

(54) DEVICE FOR CD REPRODUCTION WITH VARIABLE SPEED OR DIRECTION

(75) Inventor: Ingo Hütter, Celle (DE)

(73) Assignee: Thomson Licensing S.A., Boulogne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,532

(22) Filed: Mar. 19, 1998

(30) Foreign Application Priority Data

Mar. 29, 1997 (DE) .......................... 197 13 286

(51) Int. Cl.⁷ .................................. G11B 7/00
(52) U.S. Cl. ................. 369/47.32; 369/47.35; 369/57.21
(58) Field of Search ............... 369/54, 58, 60, 369/59, 124; 386/68, 81, 82, 111, 112

(56) References Cited

U.S. PATENT DOCUMENTS

| | | | | |
|---|---|---|---|---|
| 4,796,247 A | * | 1/1989 | Vogelsang | 369/33 |
| 4,837,637 A | * | 6/1989 | Akiyama et al. | 369/32 |
| 4,963,992 A | * | 10/1990 | Doi et al. | 386/75 |
| 5,477,516 A | * | 12/1995 | Takezawa | 369/48 |
| 5,590,101 A | * | 12/1996 | Itoi | 369/44.28 |
| 5,612,933 A | * | 3/1997 | Iso et al. | 369/32 |
| 5,621,712 A | * | 4/1997 | Nonaka | 369/60 |
| 5,627,809 A | * | 5/1997 | Honjo | 369/47 |
| 5,671,204 A | * | 9/1997 | Yokouchi et al. | 369/60 |
| 5,708,631 A | * | 1/1998 | Takenaka et al. | 369/32 |
| 5,717,534 A | * | 2/1998 | Yahagi et al. | 360/51 |
| 5,740,143 A | * | 4/1998 | Suetomi | 369/60 |
| 5,740,144 A | * | 4/1998 | Kimura et al. | 369/60 |
| 5,751,887 A | * | 5/1998 | Nitta et al. | 386/68 |
| 5,768,236 A | * | 6/1998 | Kihara | 369/60 |
| 5,793,739 A | * | 8/1998 | Tanaka et al. | 369/60 |
| 5,923,627 A | * | 7/1999 | Miwa et al. | 369/47 |
| 5,936,926 A | * | 8/1999 | Yokouchi et al. | 369/60 |
| 5,951,710 A | * | 9/1999 | Kihara et al. | 369/60 |
| 5,974,581 A | * | 10/1999 | Nagai et al. | 369/48 |
| 6,026,067 A | * | 2/2000 | Tanaka | 369/48 |

FOREIGN PATENT DOCUMENTS

| | | |
|---|---|---|
| DE | 3407921 | 9/1984 |
| EP | 0708443 | 10/1995 |

* cited by examiner

*Primary Examiner*—Nabil Hindl
(74) *Attorney, Agent, or Firm*—Joseph S. Tripoli; Paul E. Kiel

(57) ABSTRACT

The invention relates to a device for CD reproduction with variable speed or direction, in particular devices compatible with a CD player, such as, for example, DVD players which are likewise suitable for the playback of CDs, or corresponding CD-ROM drives. The invention is based on the fact that the data or information read from the CD are read into a buffer memory at a rate which, as a rule, is higher than is required for real-time reproduction. Data read into the buffer memory (RAM) in a continuous sequence are then used for CD reproduction with variable speed by means of subsampling or oversampling. For the purpose of reverse reproduction, groups of subcode words are successively read from the buffer memory by changing the order within the groups and are reproduced as a continuous reproduction data stream. Preferably, assemblies present in a reproduction device are used for CD reproduction with variable speed or direction and an improved comprehensibility of the reproduced information and also more accurate finding of a desired reproduction position are achieved.

11 Claims, 5 Drawing Sheets

DEVICE FOR CD REPRODUCTION WITH VARIABLE SPEED OR DIRECTION

The invention relates to a device for CD reproduction with variable speed or direction. The field of application of the invention relates to CD playback devices, in particular devices that are compatible with a CD player, such as, for example, DVD players which are likewise suitable for the playback of CDs or corresponding CD-ROM drives, which enable data or information stored on a CD to be reproduced with an increased or reduced speed and also with a variable direction. Aspects of the invention are, inter alia, an improved comprehensibility of the reproduced information, fast and accurate moving to desired positions, and also reverse playback.

During a fast forward run or reverse run, known audio CD players have only a low comprehensibility of the reproduced information. Between short sequences which are played back at normal speed, a wide jump to the next sequence is carried out, so that the feeling of a fast forward run is imparted to the user.

During the jumping from one sequence to a next sequence, which, as a rule, is carried out over a plurality of tracks, no information is read from the recording medium, with the result that data are read into a buffer memory in a discontinuous sequence and gaps arise between the reproduction sequences. Although the information reproduction takes place at normal speed or in real time, the user can hardly follow the playback progress on account of a low comprehensibility or a low deducibility of the reproduced information. It proves to be very difficult to follow the information reproduced in fragments and to deduce the content thereof and also to stop or begin the reproduction at a desired position.

The object of the invention, therefore, is to provide CD playback devices which enable CD reproduction with variable speed or direction in conjunction with improved deducibility or comprehensibility of the reproduced information, with a low outlay.

According to the invention, this object is achieved by means of the features specified in main claims. Advantageous designs and developments are specified in subclaims.

The invention is based on the fact that the data or information read from the CD are read into a buffer memory at a rate which, as a rule, is higher than is required for real-time reproduction. This is applicable for example to vibration-resistant CD playback devices, CD-ROM drives and also to DVD playback devices.

Vibration-resistance CD playback devices have a buffer memory into which data or information read from the recording medium are read at a doubled rate, as a rule, and are read out at a normal rate for reproduction. An electronic control unit ensures that by targeted jumping-back of the pick-up, the continuity of the data stream is ensured and the buffer memory is filled to a maximum extent. The size of the buffer memory is then the decisive factor regarding the length of time that the playback device is capable of interruption-free reproduction of information or data of the recording medium when there is an interruption of the data stream read from the recording medium. Furthermore, vibration-resistant CD playback devices are known in which the rate at which data are read from the CD is regulated as a function of the occupancy of the buffer memory.

In a CD-ROM drive, which, as a rule, is connected to a computer, the hard disk or a virtual memory can be used as a buffer memory of appropriate capacity. DVD playback devices are also intended to be able to play compact discs or normal audio CDs. For this purpose, the same hardware as is necessary for the playback of DVDs is then used. That is to say that a large buffer memory is available into which the data from the CD are read at a higher rate than in the case of normal CD players. In this case, too, an electronic control unit ensures that by targeted jumping-back of the scanning unit or the pick-up, the continuity of the data stream in the buffer memory is preserved. This surplus of data read from the CD is advantageously used, according to one aspect of the invention, for CD reproduction with variable speed in conjunction with improved comprehensibility of the reproduced information.

In contrast to the solution known from the prior art, individual sequences of the recording medium are not reproduced discontinuously, rather the data of the recording medium are read from the buffer memory without any gaps, or continuously, with subsampling for the purpose of a fast forward run or with oversampling for the purpose of slowing down the reproduction speed.

An information reading means with which the reproduction speed is set is provided for this purpose in the device for CD reproduction with variable speed. The information reading means comprises a read-write controller for the buffer memory, which controller, according to the respective design, is optionally connected to a FIFO and a D/A converter. The units that are already present in CD playback devices or in CD-compatible devices can thus advantageously be used, according to a second aspect of the invention, for the fast forward run, slowing down the reproduction speed or also reverse playback with improved comprehensibility of the reproduced information. In the fast forward run, the data are read from the buffer memory at an increased rate compared with normal operation, by skipping samples. The data are read into the buffer memory likewise at a rate which is higher than a rate required for real-time reproduction or for reproduction during normal operation. This advantageously reduces the number of returns compared with normal operation. The reproduction with improved comprehensibility is achieved by the fact that using an electronic control unit, data read from the CD are read in an ordered sequence to a buffer memory as a continuous digital data stream, or read from the buffer memory with sub- or oversampling and are reproduced as a continuous data stream. In the case of subsampling, only every second or nth sample is read from the buffer memory by the information reading means and joined together to form a continuous data stream. The result of the subsampling is then a data stream having a doubled or n-fold rate. The subsampling also leads to the known frequency increase, where it has emerged, however, that an improved comprehensibility is achieved in comparison with the known reproduction of segments at normal speed with gaps. Furthermore, it has been found that a higher repetition rate of skipped samples leads to less aliasing than a lower repetition rate. Sharing out information omissions over an information period has a less disturbing effect than a concentrated appearance of the same information loss. On account of the improved comprehensibility of the reproduced information, the playback progress of the CD can be better followed and, as a result, according to a further aspect of the invention, it is possible to move to a desired position or passage with higher accuracy. The read-write controller present in CD or CD-compatible devices can be induced to effect the sub- or oversampling for the purpose of changing the CD reproduction speed by means of an input signal. In the case of oversampling, which leads to the CD reproduction speed being slowed down, samples stored in the buffer memory are read out a number of times in accordance with the slowing-down rate and joined together to form a continuous data stream. It is thereby possible to move to a desired position or passage with high precision.

A further aspect of the invention consists in changing the reproduction direction or reverse playback of a CD. In principle, the reproduction of information stored on a CD in the reverse direction by reversing the scanning direction is not possible on account of the type of modulation that is used and a bit sequence that must be observed. The filling-in of bits that is connected with the type of modulation chosen for CDs, in 8-to-14 modulation, and the insertion of coupling bits require that information stored on the CD be played back or reproduced in the forward direction. Furthermore, reverse scanning would cause the order of MSB and LSB to be interchanged. Despite these obstacles, CD reproduction in the reverse direction is enabled in the following manner:

- scanning direction or direction of rotation of the CD corresponding to the direction used in normal operation,
- reading of a first predetermined number of subcode blocks into the buffer memory
- reproduction or read-out from the buffer memory beginning at the last sample in the last subcode block of the first predetermined number of subcode blocks through to the first sample of the first subcode block,
- requesting of a second predetermined number of subcode blocks from the recording medium which lie before the output block of subcode blocks.

This requesting or the reading into the buffer memory must already be concluded before the read-out of the first sample of the first subcode block of the first predetermined number of subcode blocks in order that the second predetermined number is available for read-out immediately after the output of the first predetermined number. A predetermined number of 50 subcode blocks, which corresponds to a reproduction time of approximately 0.66 second at normal speed, has proved to be advantageous in the case of an audio CD.

A further aspect of the invention is CD reproduction with a very high speed. For reproduction with a y-fold speed, ranges of a predetermined number of subcode blocks, which number is 50, for example, are then reproduced and (y−1)·n subcode blocks are then skipped. The subcode blocks that are reproduced or read from the buffer memory are likewise joined together to form a continuous data stream. The continuous data stream is then reproduced at a normal rate. However, it is also possible firstly to buffer-store this data stream and then subject it once again to sub- or else oversampling. An improved comprehensibility is achieved by the multistage sampling and combination of sub- and oversampling, particularly at very high reproduction speeds.

The invention is explained in more detail below with reference to drawings.

CD reproduction with variable speed or direction is carried out with sub- or oversampling or a sequence change of samples S stored in a buffer memory RAM. In the case of an audio CD, a sample consists of two 16-bit data words, which are optionally followed by subcode and error correction data, according to the memory organization. For CD reproduction with an increased speed, in particular, according to a first method step of the invention, data or information are read from the CD into a buffer memory RAM at a rate which is greater than a rate necessary for CD reproduction in real-time operation. The term real-time operation is used synonymously here for a reproduction mode which corresponds to playback at a normal speed or reproduction for which the recording medium is usually intended, in order to carry out reproduction in such a way that it essentially corresponds to the sequence of events during recording.

After a CD has been inserted into a playback device, firstly the list of contents is read. Stored in the list of contents are data which provide information concerning the start times and number of stored programme blocks and the total playing time thereof. In addition, so-called time code data which are used as a time reference are provided. This makes it possible directly to search for, or move to, programme blocks, which respectively correspond to a title in the case of an audio or video CD, and to begin their reproduction. In addition to the start positions of the titles, it is also possible to jump directly to other reproduction locations using a so-called index. However, assignment to the information present at the scanning locations is only possible after reproduction.

Figure 1:
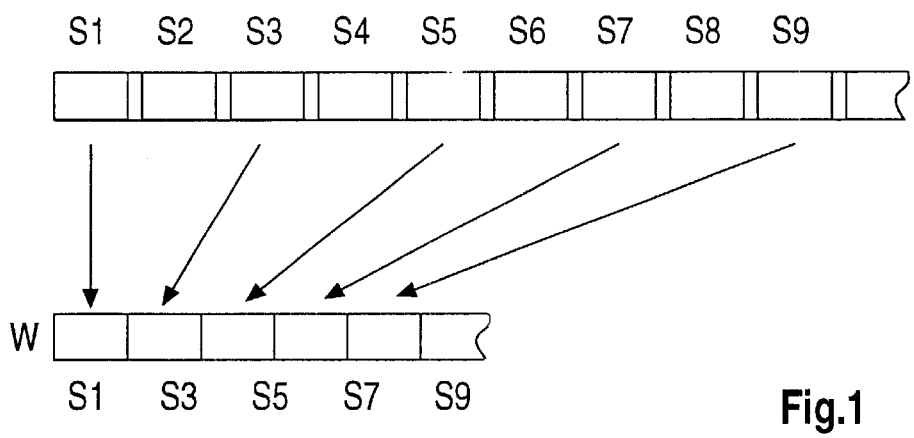
FIG. 1 shows a schematic sketch for subsampling.
Figure 2:
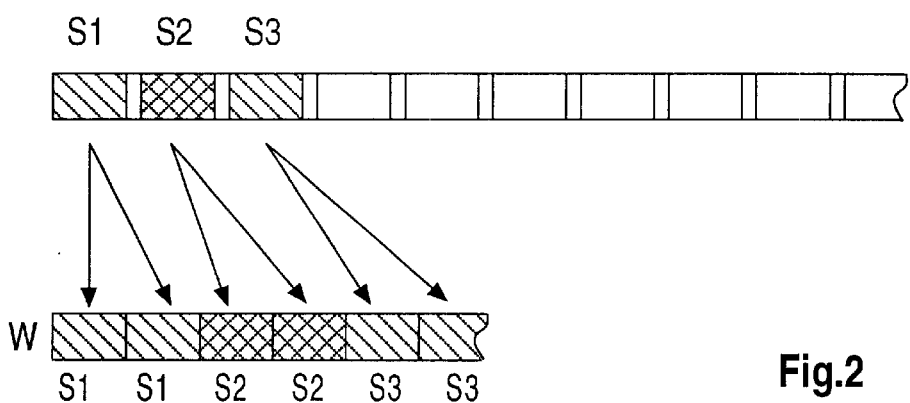
FIG. 2 shows a schematic sketch for oversampling.
Figure 8:
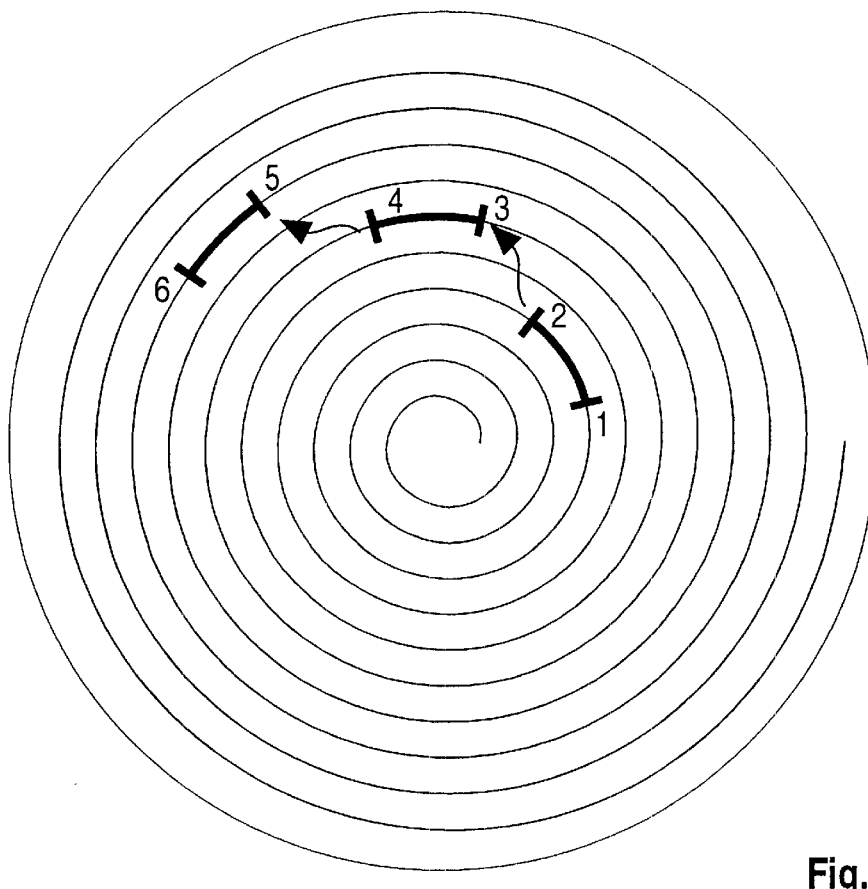
FIG. 8 shows a schematic sketch for known CD reproduction with an increased speed and FIG. 9 shows a schematic sketch for known subsampling.
Figure 9:
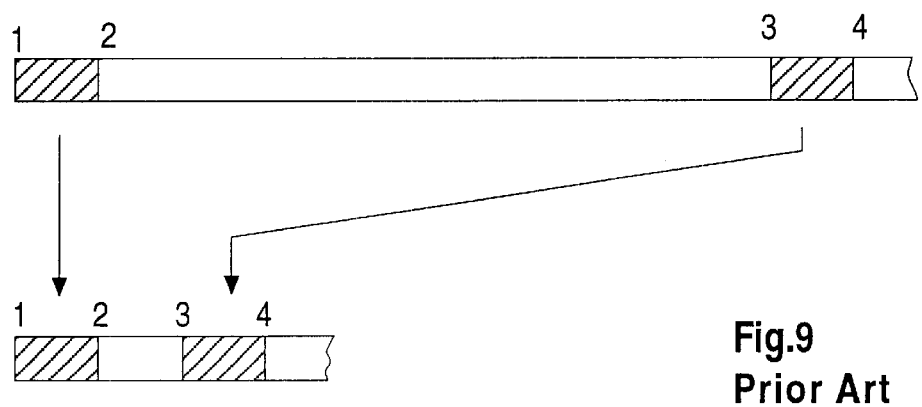

In order to deduce the content of information stored on a CD in a short time, a fast forward run with good comprehensibility of the reproduced information is therefore necessary. Furthermore, in order to reproduce desired passages of the elements within a title or to copy specific information to another recording medium, it is necessary to move to the location of the desired information with high accuracy. The comprehensibility of the information reproduced during the operation of moving to a desired information position is therefore a necessary precondition for the accuracy. In order to reproduce information stored on a CD in the fast forward run, it is known, according to FIG. 8, to reproduce a sequence 1–2 of the CD at normal speed or in real time, subsequently to skip a plurality of tracks and reproduce a further sequence 3–4, which is then respectively followed, once again after a jump, by a further sequence 5–6. The method, which is not illustrated to scale in FIG. 8 for the purpose of clarity, has the result that, on account of the jumps from sequence 1–2 to sequence 3–4, . . . , governed by the jumping, gaps or periods of time arise in which no information is read from the CD. This is also reflected in the data stream, which is illustrated as a schematic sketch in FIG. 9. The skipping of data tracks shortens the time interval during reproduction compared with real-time operation, thereby giving rise to the impression of a fast forward run. The sequences 1-14 2, 3–4 are reproduced at a normal speed or in real-time operation, but, according to FIG. 9, have gaps between the sequences 1–2, 3–4, . . . Gaps between the reproduction sequences are caused for example by different jump times in the inner and outer regions of the CD and mechanical properties of the scanning system. The comprehensibility of the reproduced information is low, with the result that the reproduction progress can be followed only with very great difficulty or, in the vast majority of cases, not at all. This alone means that it is not possible to move to a desired information passage. Furthermore, stored information values between the sequences 1–2, 3–4, . . . are fundamentally not available for reproduction, on account of the jumping. These disadvantages are overcome by a method and an arrangement in which information stored on the CD is read into a buffer memory RAM at an increased rate compared with real-time operation and are joined together with subsampling to form a serially uninterrupted or continuous reproduction data stream W. FIG. 1 illustrates the samples S1 . . . S9 of a data stream read from a CD, in the case of an audio CD a sample S1 . . . S9 consisting respectively of two 16-bit data words, which are followed by subcode and error correction data. Depending on the type of buffer memory RAM chosen, the data stream is stored completely or only the data words or samples S1 . . . S9 containing the actual information are stored. For reproduction with an increased speed, the volume of information which, initially, is still read in complete form from the CD is then reduced by subsampling during the read-out from the buffer memory RAM. In the event of CD reproduction with a doubled speed, according to FIG. 1 every second sample S1, S3, S5, S7, S9 is used for reproduction. These samples S1, S3, S5, S7, S9 are then joined together, on the basis of an addressed arrangement in the buffer memory RAM, to form a continuous reproduction data stream W. The reproduction data stream W then advantageously has no gaps between the samples S1, S3, S5, S7, S9, with the result that a larger volume of information than compared with the known CD reproduction mode is available and is then reproduced at a normal speed for CD reproduction in the fast forward run. However, it is not only this aspect that leads to an improved comprehensibility of the reproduced information. With regard to the comprehensibility of the reproduced information, it has emerged that, with reference to a specific volume of information, the comprehensibility is better when the information loss is uniformly distributed than when the information loss appears in a concentrated manner. A noticeable difference can be ascertained in respect of the comprehensibility, even though both the individual sequences 1–2, 3–4, . . . and the samples S1, S3, S5, S7, S9 are reproduced at a normal speed or, with reference to a sequence 1–2, 3–4, . . . or a sample S1, S3, S5, in real-time operation. With the method specified, the comprehensibility of CD reproduction in the fast forward run is increased, the reproduction progress can be better followed and a desired information reproduction position is reached with higher accuracy. The higher accuracy is achieved not only by the improved comprehensibility but also by information gaps having a shorter length. In order further to increase the precision when moving to a desired information reproduction position, subsampling is provided. For this purpose, according to FIG. 2, samples S1, S2, S3, . . . stored in the buffer memory RAM are reproduced repeatedly. The single repetition of each sample S1, S2, S3 illustrated in FIG. 2 leads to a reproduction speed which is reduced by half and makes it possible to move to a desired reproduction position with higher accuracy since the reaction region for stopping at a desired position is enlarged.

Figure 3:
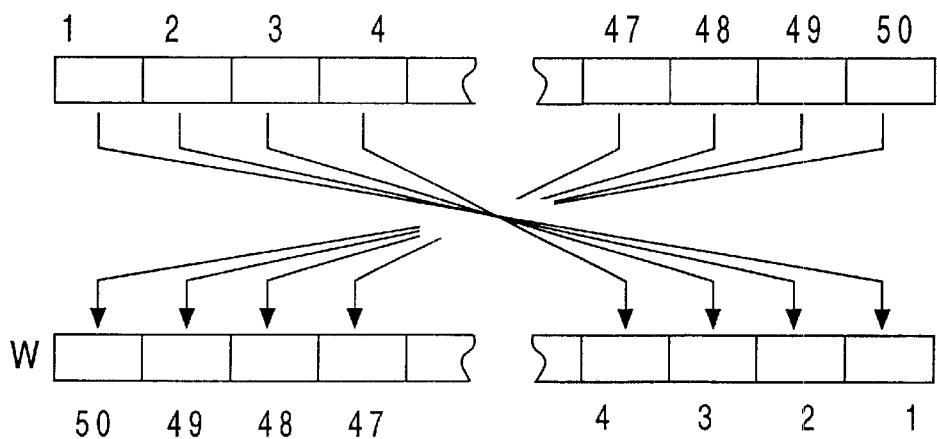
FIG. 3 shows a schematic sketch for reverse reproduction.

A further aspect is that of enabling CD reproduction in the reverse run. For this purpose, the buffer memory RAM which is present in any case in every CD reproduction device is likewise used in an advantageous manner. Even though the data stream read from a CD for reproduction can, in principle, only have a prescribed direction on account of the type of modulation that is used and the bit sequence to be observed, reverse reproduction is nevertheless enabled. For this purpose, a buffer memory RAM which is present in any case in every CD reproduction device is likewise used in an advantageous manner. Although the CD reproduction is to be effected in the reverse direction, the CD is played back in the forward direction corresponding to normal operation. In order nevertheless to enable reverse reproduction, in a first method step a first predetermined number of subcode blocks, which number is 50, for example, in a design corresponding to FIG. 3, are read into the buffer memory RAM. The subcode blocks 1 . . . 50 which have been read into the buffer memory RAM in the forwards direction are then read out or reproduced, in a second method step, beginning with the last sample in the last subcode block 50 through to the first sample of the first subcode block 1. A second predetermined number of subcode blocks which lies before the output block of subcode blocks is then requested from the recording medium, thereby ensuring continuity of the reproduction data stream W even in the case of reverse reproduction. The second predetermined number of subcode blocks preferably corresponds to the first number, in which case the number should preferably be smaller than the maximum storage capacity of the buffer memory RAM in order that the second predetermined number is available immediately after the read-out of the first predetermined number. The number of 50 subcode blocks which is specified in this exemplary embodiment and corresponds to a reproduction time of approximately 0.66 second at normal speed has turned out to be advantageous in the case of audio CD reproduction.

The methods specified may also be executed in a combined or multistage manner. As examples of these, two-stage subsampling is specified in FIG. 4 and a combination of sub- and oversampling is specified in FIG. 5. However, all other combinations which are not illustrated here are also possible.

Figure 4:
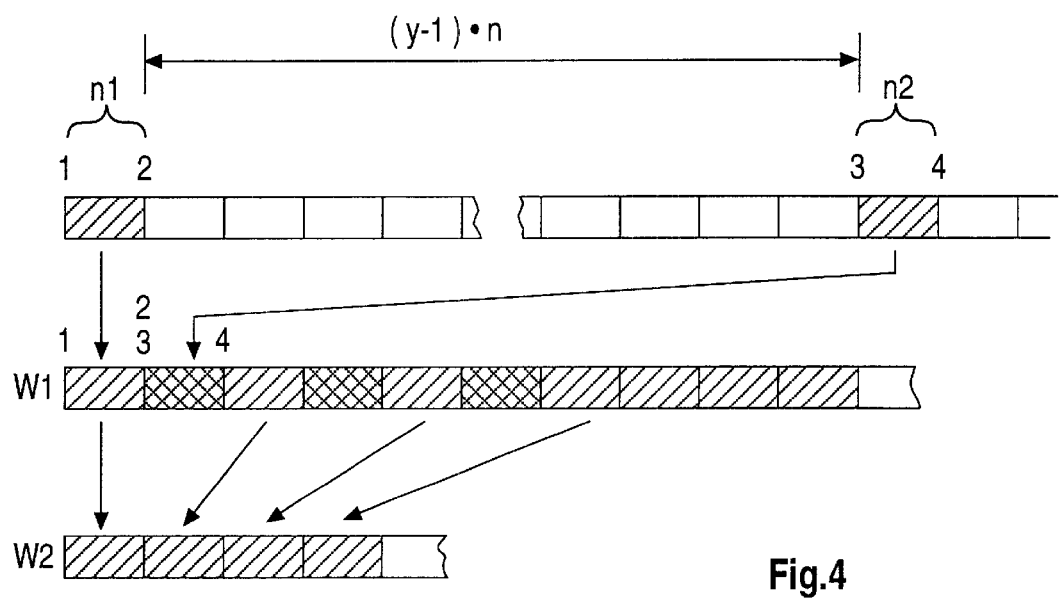
FIG. 4 shows a schematic sketch for multistage subsampling.
Figure 5:
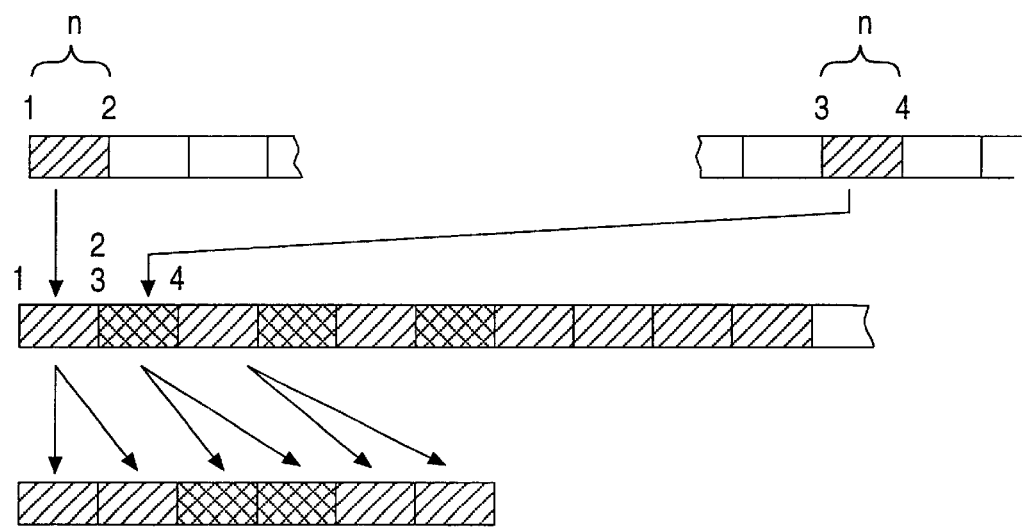
FIG. 5 shows a schematic sketch for mixed sub- and oversampling,FIG.

CD reproduction with a very high speed, which is explained with reference to FIG. 4 and FIG. 5, can be executed either in one stage or else in a multistage manner. In order to realize CD reproduction with a y-fold speed, in a single-stage design a predetermined number n1 of subcode blocks, which, number is 50, for example, are reproduced and then (y−1)·n subcode blocks are skipped in order to continue with the reproduction of the second number n2 of subcode blocks. According to FIG. 4, the subcode blocks are likewise joined together to form a continuous, first reproduction data stream W1. The reproduction of this reproduction data stream W1 at a normal speed then already leads to a y-fold speed of the CD reproduction in a single-stage method. On the other hand, according to FIG. 4, the first reproduction data stream W1 can be subjected to a second subsampling, as a result of which a reproduction data stream W2 for 2y-fold CD reproduction is then available. The degree of subsampling, which is specified here only by way of example, can be chosen as desired. In the case of multistage CD reproduction with y-fold speed, the sampling intervals are correspondingly reduced. For extremely high reproduction speeds, a combination of sub- and oversampling in accordance with FIG. 5 is expedient in certain speed ranges, in order to reduce frequency increase effects and to achieve an improved comprehensibility.

Figure 6:
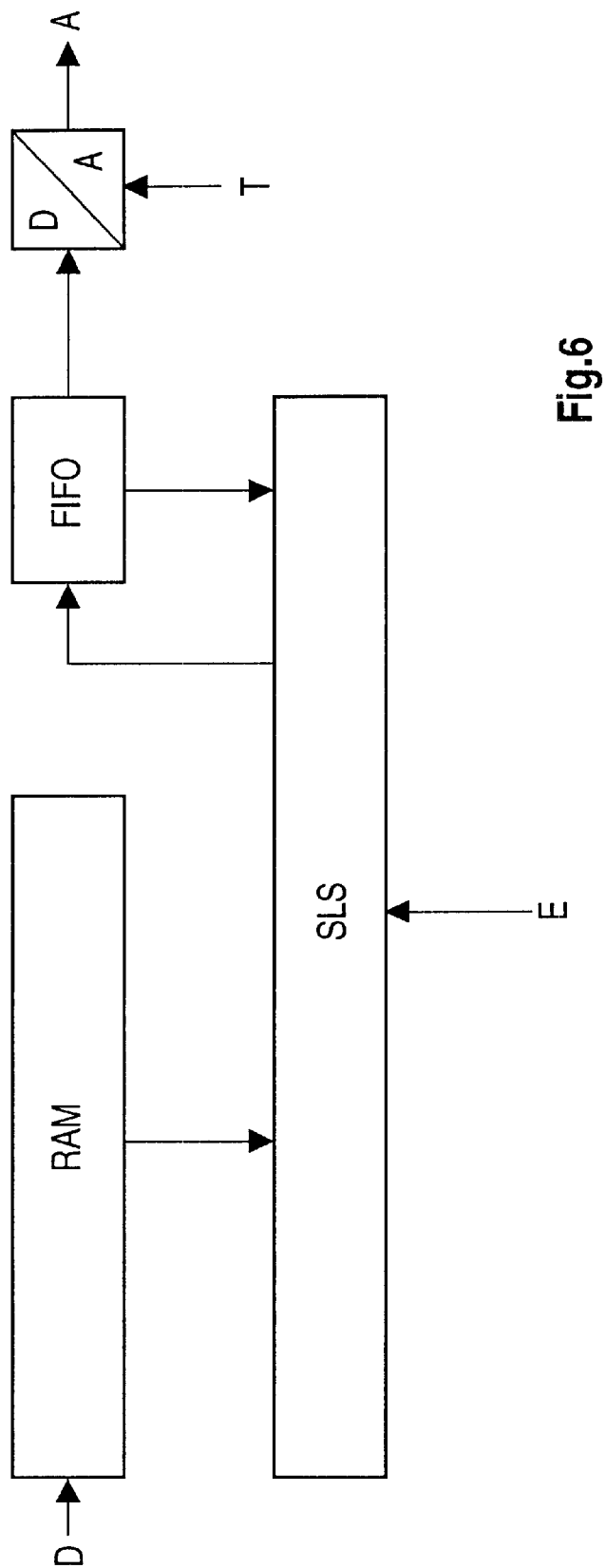
FIG. 6 shows a circuit arrangement for CD reproduction with variable speed or direction.

The CD reproduction with variable speed or direction is provided for CD reproduction devices which have an appropriately sized buffer memory RAM or a buffer memory RAM into which the data or information of the recording medium are read at a rate which is increased with respect to that which is necessary for CD reproduction in real-time operation. Devices which are compatible with the CD reproduction device with a normal speed are advantageously suitable for this purpose, in particular, since they already have an appropriately sized buffer memory RAM or units for reading the recording medium at an increased speed, which are then used to realize the abovementioned methods. This is applicable for example to vibration-resistant playback devices, in which the CD is read at an increased speed. In DVD playback devices, on the other hand, a relatively large buffer memory RAM is available. A controller provided in devices of this type ensures that the buffer memory RAM is filled with data or information read from the recording medium. However, the field of application is not restricted to devices of this type. In principle, an inventive device for CD reproduction with variable speed is constructed according to the circuit arrangement specified in FIG. 6. The device has a buffer memory RAM, into which data or information from a disk D are read. Connected to the buffer memory RAM is a read-write controller SLS, by means of which, according to a control signal applied to the input E of the read-write controller SLS, samples or subcode blocks are read out with sub- or oversampling for the purpose of CD reproduction with variable speed. Buffer memory RAM and read-write controller SLS are, consequently, already sufficient preconditions for CD reproduction with variable speed. The circuit arrangement specified in FIG. 6 additionally has a FIFO memory, in order to enable an asynchronous mode of operation of the device. Connected to the FIFO is a D/A converter, by means of which the analogue output signal A is provided in the case of an audio reproduction device. For this purpose, the D/A converter is clocked at a clock rate T which corresponds to that used for reproduction in real time or with normal speed.

Figure 7:
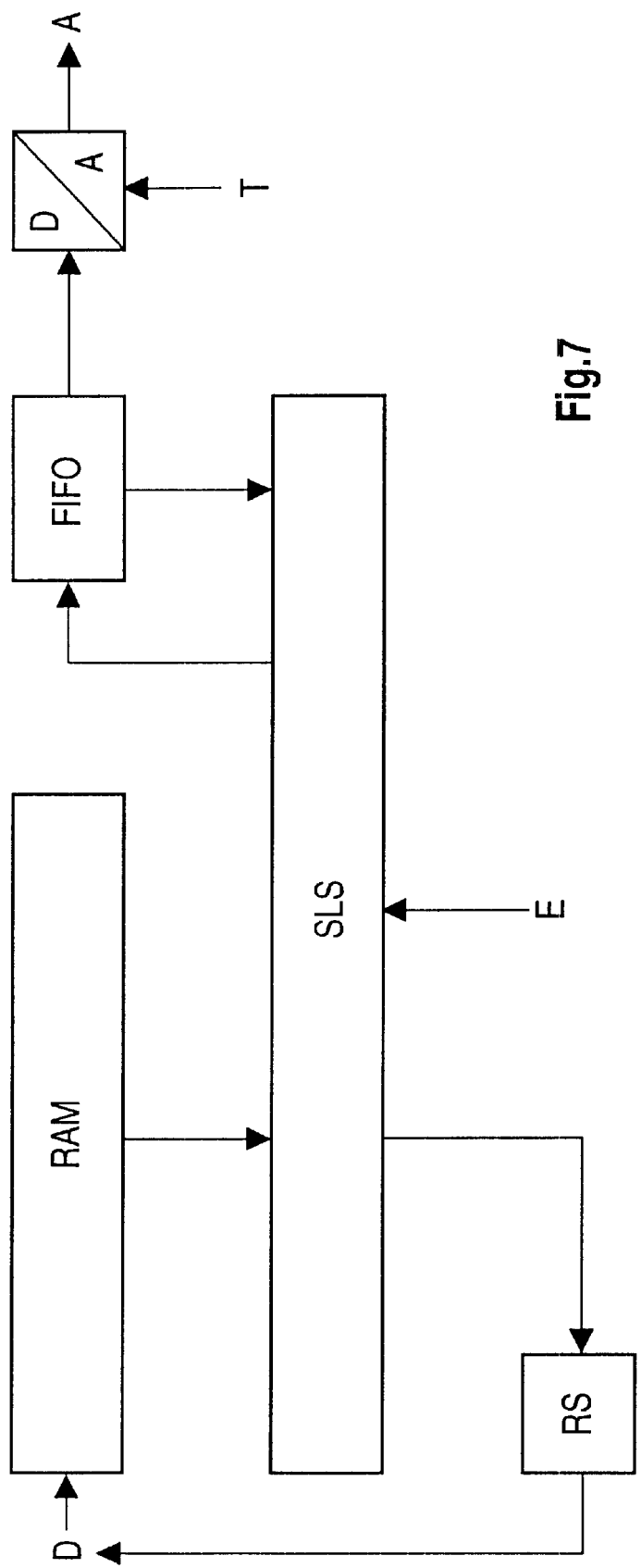
FIG. 7 shows a circuit arrangement for CD reproduction in the reverse direction.

For CD reproduction in the reverse direction, according to FIG. 7 a reverse control means RS is provided which is connected to the read-write controller SLS, in order to read the disk D at a location having subcode blocks which are arranged before already read subcode blocks on the disk D. The reverse control means RS can be integrated with little outlay in the controller for filling the buffer memory RAM, since addressing for finding the necessary subcode blocks is sufficient. In respect of all the other component parts, FIG. 7 corresponds completely to the circuit arrangement specified in FIG. 6. For CD reproduction in the reverse direction, a signal is applied to the control input E of the read-write controller SLS, which signal induces the read-write controller to carry out the abovementioned method steps. The field of application of the invention is not restricted to the exemplary embodiments specified here, since it can be used generally for information or data reproduction with variable speed and direction. In addition to the application for audio mentioned here, an application taking account of the data formats is also possible in the field of video and data technology.

What is claimed is:

1. A data reproduction device for an optical apparatus comprising:
    a buffer memory into which digital data are read from a recording medium in a continuous sequence, and
    a read-write controller connected to the buffer memory
    for reading out sampled samples of the digital data from the buffer memory with sub-sampling by reading every second or nth sample from the buffer memory with increased reading speed for a fast forward reproduction without signal interpolation or
    for reading out sampled samples of the digital data from the buffer memory with over sampling by a number of times reading out each sample with normal reading speed for slowing down the reproducing without signal interpolation and
    for joining together the samples to form a continuous data stream for providing a data reproduction with variable speed.

2. Device according to claim 1, wherein the continuous data stream for providing data reproduction with variable speed is reproduced as a continuous reproduction data stream at a normal speed.

3. Device according to claim 1, wherein in the event of reproduction with a lower speed than a normal speed, samples are read from the buffer memory with over sampling and are reproduced as a continuous reproduction data stream at a normal speed in order to move to a desired reproduction position.

4. Device according to claim 1,
    wherein groups of subsampled or oversampled samples are successively read from the buffer memory by changing the order within the groups and are reproduced as a continuous reproduction data stream for the purpose of reverse reproduction.

5. Device according to claim 1, further comprising assemblies used for CD reproduction with variable speed or direction.

6. Device according to claim 1, wherein said buffer memory and said read-write controller are components of a DVD player or CD player.

7. Device according to claim 1, wherein the sub sampling and the over sampling are combined for providing a data reproduction with variable speed.

8. Device according to claim 1, wherein the sub sampling or the over sampling is performed in a multistage manner for providing a data reproduction with variable speed.

9. A data reproduction device for an optical apparatus comprising:
    a buffer memory for storing data read in a continuous sequence from a reading medium; and
    a read-write controller connected to the buffer memory for reading out sub sampled samples from the buffer memory during a fast forward reproduction mode by reading every second or nth sample of the stored samples with increased reading speed without signal interpolation,
    for reading out oversampled samples from the buffer memory during a slowed reproduction mode by reading out each stored sample a predetermined number of times with normal reading speed without signal interpolation and
    for joining together the read out samples to form a continuous data stream in one of said fast forward and slowed reproduction modes.

10. The device according to claim 9, wherein the read-write controller reads out subsampled samples from the buffer memory during a fast reproduction mode by skipping a predetermined number of stored samples, and joins together the read out subsampled samples to form a continuous data stream for playback in the fast reproduction mode.

11. The device according to claim 9, wherein the read-write controller reads out subcode blocks wherein a predetermined number of stored subcode blocks are skipped during a very fast reproduction mode, and joins together the read out subcode blocks for playback in the very fast reproduction mode.

* * * * *